INVENTOR
CHARLES J. WHEELER
BY *C.T. Cross*
ATTORNEY

June 3, 1958

C. J. WHEELER 2,836,887

CUTTER FOR SEVERING CAST IRON PIPE AND THE LIKE

Filed June 3, 1957

INVENTOR
CHARLES J. WHEELER
BY *C. T. Cross*
ATTORNEY

June 3, 1958  C. J. WHEELER  2,836,887
CUTTER FOR SEVERING CAST IRON PIPE AND THE LIKE
Filed June 3, 1957  3 Sheets-Sheet 3

INVENTOR.
CHARLES J. WHEELER
BY
C.T. Cross
ATTORNEY

United States Patent Office 2,836,887
Patented June 3, 1958

2,836,887

CUTTER FOR SEVERING CAST IRON PIPE AND THE LIKE

Charles J. Wheeler, Mentor, Ohio, assignor to Wheeler Manufacturing Corporation, Ashtabula, Ohio, a corporation of Ohio Application June 3, 1957, Serial No. 663,137

9 Claims. (Cl. 30—92)

This invention relates to the cutting of hollow articles, and more particularly relates to new and improved apparatus for cutting hollow articles.

This invention is a continuation-in-part of my prior application Serial Number 578,208 filed April 16, 1956 and constitutes an improvement thereon.

Up to the present time, the cutting of hollow articles, especially cylindrical or tubular articles as well as hollow articles of rectangular cross section such as various types of conduits or pipes, notably cast iron pipe, frequently has been a difficult and time-consuming operation. Cast iron pipe is typical of a hollow article which has heretofore been especially difficult to cut quickly and accurately. For that reason, cast iron pipe is particularly referred to throughout the specification and claims although it is to be understood that the practice of this invention, while especially advantageous in the cutting of cast iron pipe is not limited thereto.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while undoubtedly affording means of cutting pipe accurately, generally is slow and relatively costly since the saw blade life often is relatively short. Moreover, it will be appreciated that, at times, the use of a power hack saw is either impracticable or impossible. In addition, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting cost and space limitations are additional factors to be considered.

There is described and claimed in my above-mentioned pending application a new and useful cutter employing a stationary cutter chain and a pressure clamp which cutter avoids the difficulties in cutting pipe characterizing prior rotary or oscillatable cutters as well as the problems associated with the use of saws, chisels and metal cutting torches. While the apparatus described and claimed in my prior-mentioned, copending application provides a singular advance over the art, and while perfectly satisfactory operation is obtained if a minimum of care is exercised in positioning the cutter about the work to be cut, it has been found that in certain instances with careless operation of such apparatus at times difficulty was encountered in that the cutter chain beyond that used in cutting became improperly engaged between the pressure clamp jaws. In some instances, where pressure was applied while the cutter chain was thus improperly engaged, the cutters were crushed or deformed. The present invention comprises an improvement on such a cutter which renders it even more advantageous in use and avoids damaging the cutter by improper positioning of the cutter chain between the cutter jaws.

Accordingly, the principal object of this invention is to avoid the difficulties heretofore encountered and to provide new and improved apparatus for cutting pipe or other hollow articles wherein damage to the apparatus through careless operation is avoided.

A further object of the invention is the provision of new and improved apparatus for cutting hollow articles, notably pipe.

These and other objects and advantages of the invention will more fully appear from the following description thereof.

Briefly, the present invention described and claimed in my above-mentioned pending application is based upon the discovery that hollow articles, especially those formed of relatively brittle materials, e. g., cast iron pipe, can readily and accurately be cut by applying substantially uniformly circumferentially distributed, linearly-concentrated, radially-directed, squeeze cut pressure to the article sufficient to effect cutting thereof. The practice of that invention has proved to be especially advantageous with respect to relatively brittle articles such as cast iron pipe, hollow tile, and the like. Surprisingly, cutting properly effected in accordance with my invention does not cause shattering, cracking, or other injury to the article being cut. Moreover, it will be appreciated that the practice of my invention does not involve rotation or oscillation of apparatus about the pipe or other article being cut, but, on the contrary, provides a direct, rapid, accurate means of cutting hollow articles formed of cast iron and other materials.

The present invention comprises the provision in a cutter of the type referred to of means between the clamp jaws to prevent improper engagement of the cutters when the cutter chain links are arranged in any but the proper manner. More specifically, the apparatus of this invention comprises such a cutter having embodied therein a projection from at least one of the jaws subjacent cutters properly engaged by said jaws, across the V-shaped jaw opening whereby an engagement of cutter links beyond the desired chain length between the jaws is precluded.

Reference is now made to the accompanying drawings which illustrate various embodiments of the apparatus of this invention.

Figure 1:
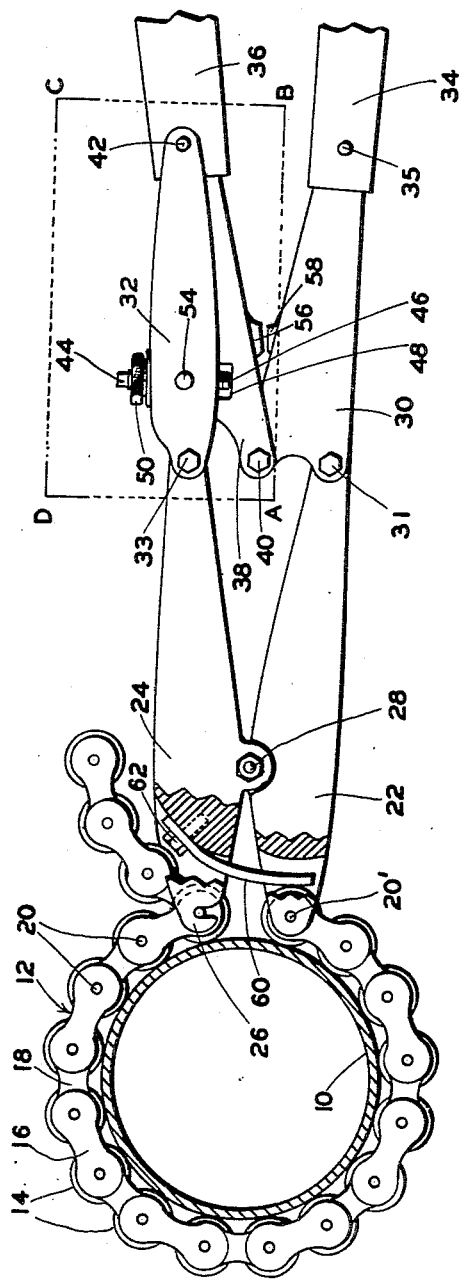
Fig. 1 is a fragmentary view, partially in section, of a cutter embodying the invention.

Thus far, it will be appreciated that apparatus of this invention includes a non-extensible cutter chain preferably containing a plurality of spaced, uniformly circumferentially distributed cutter edges, and means to apply radially directed pressure thereto. Generally, this means may comprise a variety of pressure sources including, for example, purely mechanical, electrical or hydraulic devices, or some combination thereof. Hence, it will be understood that different means may be employed to apply pressure to a series of cutter edges linearly disposed around an article to be cut whereby a concentrated, resultant, inwardly radially directed article-cutting force is achieved.

At present, it generally is preferred to utilize as this means a pressure clamp adapted to engage the cutter linkage, e. g., with the two jaws of the clamp, and by movement of the jaws to effect the application of tension to said linkage while disposed about the pipe or other article to be cut, thus imparting a concentrated pipe constricting, squeeze cutting pressure sufficient to shear through the pipe wall. A specifically preferred means for applying pressure to the cutter edges is a compound leverage pressure clamp mechanism of the type usually employed in a manually operated bolt cutter. Such a device typically includes two handles which are pivotally connected to each other near one end and each of which pivotally supports an adjustable second pivot arm, each of the second pivot arms in turn, pivotally supporting a third pivot arm. These third pivot arms, each pivotally secured at one end thereof to the second pivot arm are fixedly, yet pivotally, connected to each other intermediate their ends. The free ends of the third pivot arms comprise the jaws of the pressure clamp which, by means of a thus greatly multiplied leverage power, are able to exert tremendous force therebetween.

It will thus be understood that a specifically preferred apparatus of this invention, especially adapted for the cutting of cast iron pipe comprises a cutter assembly, including a plurality of spaced, pivotally mounted cutters connected into a non-extensible chain, typically a so-called roller chain as used in sprocket gear drive devices, adapted to encircle the pipe where cutting is desired and to apply thereto uniformly distributed, inwardly-directed, radial pressure sufficient to shear the pipe quickly and accurately while the cutters are stationary with respect to the pipe, one end of the linkage being connected to one jaw of a pressure clamp, especially a compound leverage pressure clamp, the other jaw of the clamp engaging the linkage at a point dictated by the size of the pipe to be cut, that it, at a point on the linkage sufficiently removed from the point of engagement of the first-mentioned clamp jaw to include therebetween a chain length substantially equal to the circumference of the pipe to be cut, there being means between said jaws, subjacent cutters engaged thereby, to preclude retention of the cutter chain between the jaws as pressure is applied, the clamp being adapted to apply tension to the linkage thereby to impart to the pipe wall a linearly concentrated, uniformly distributed, radially directed pressure around the circumference of the pipe to effect cutting thereof.

More specifically, a cutter of this invention comprises, in combination, a flexible, non-extensible cutter chain of sufficient length to surround a hollow article to be cut, and compound leverage pressure means to engage said chain about said article and apply thereto, without rotation or oscillation of the chain thereabout, radially-directed, article cutting pressure, the compound leverage pressure means comprising a pair of clamp jaws adapted to engage the cutter chain when it is disposed about the article to be cut, and a pair of handles secured to the jaws by at least one compound lever. There is provided in the opening between the jaws adjacent the connections thereon to the cutter chain, the distance from said connections being dictated by the size of the cutters, a transverse projection to bar passage of a cutter link beyond the link defining the desired cutter chain length, into the opened jaws. It will be appreciated, thus, that even if the chain is improperly engaged, crushing damage to the cutter chain is prevented.

Referring more particularly to the accompanying drawings, Fig. 1 illustrates a cutter of this invention in position about a pipe 10 to be cut. The cutter comprises a cutter chain, indicated generally at 12, and including a plurality of identical circular cutters 14 connected into a chain alternatingly by two external links 16, two internal links 18, with the cutters 14 therebetween, and transverse pins 20, the pins being formed of high strength metal or alloy and extending transversely through, and projecting therefrom, the external links 16.

Figure 2:
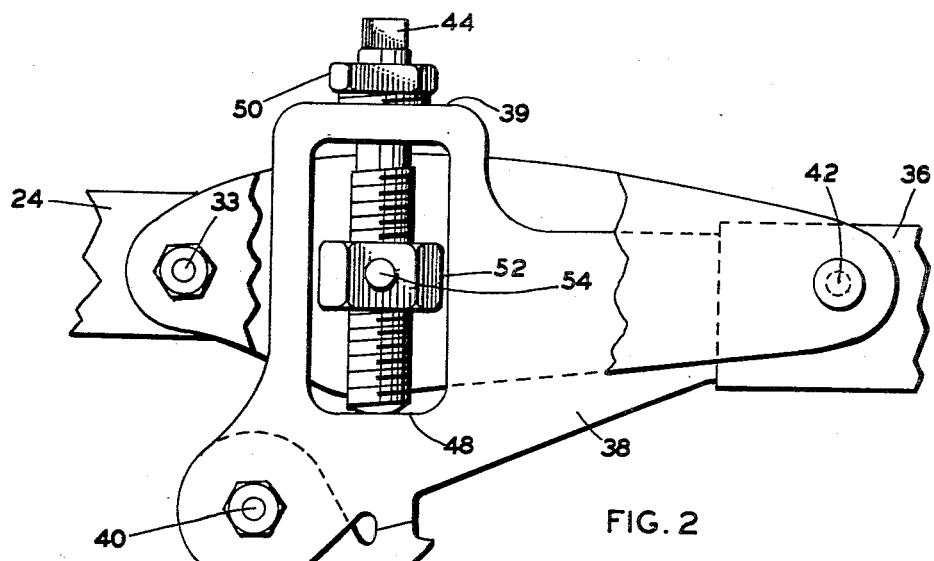
Fig. 2 is an enlarged fragmentary view, with parts broken away for clarity of the adjusting means shown in the area ABCD of Fig. 1.

The cutter chain 12 is pivotally, yet fixedly, secured at one end to a first cutter jaw 22 by pin 20' and, at a point dictated by the size of the pipe 10 to be cut, pivotally secured to a second clamp jaw 24 via pin 20 and a hook or detent 26 cut in the two spaced-apart leading edges of jaw 24. The jaws 22 and 24 are connected at a common pivot 28 intermediate their ends. At their opposite ends, the jaws 22 and 24, respectively, are pivotally secured to compound leverage elements 30 and 32 via bolts 31 and 33. These elements 30 and 32 in turn are secured to handles 34 and 36, element 32 being pivotally secured to handle 36 via bolt 42. As shown in Figs. 1 and 2, element 30 is rigidly secured to handle 34 at 35 and pivotally secured to an intermediate element 38 at 40, the opposite end of which element rigidly and fixedly is connected to handle 36. As will be appreciated by reference to Figs. 1 and 2, together, the spacing between jaw 24 and jaw 22, for a given position of the handles 34 and 36, is regulated by the positions of elements 38 and 32 which, in turn, is adjusted by loosening lock nut 50 and turning machine screw 44.

The lower end 46 of screw 44 bears against surface 48 of element 38 thereby determining the relative position of elements 38 and 32; undesired movement in the opposite direction is prevented by nut 52 threaded on screw 44 and prevented from rotation by a transverse pin 54 engaging element 32. Hence, element 32 is turned about pivot 42 by turning of screw 44. As best shown in Fig. 2, element 38 includes a vertically-disposed rectangular cut out section housing the fixed nut 52 which is moved up or down by rotation of screw 44 in the desired direction.

The means for preventing damage to the cutter chain by improper positioning and crushing of the chain between the jaws as shown in Fig. 1 comprises a curved convex projection 60 extending across the open jaw space subjacent the cutters 14 secured to the jaws 22 and 24 whereby any excess length of chain beyond that defining the desired chain length is deflected from between the jaws and damage thereto prevented.

Figure 3:
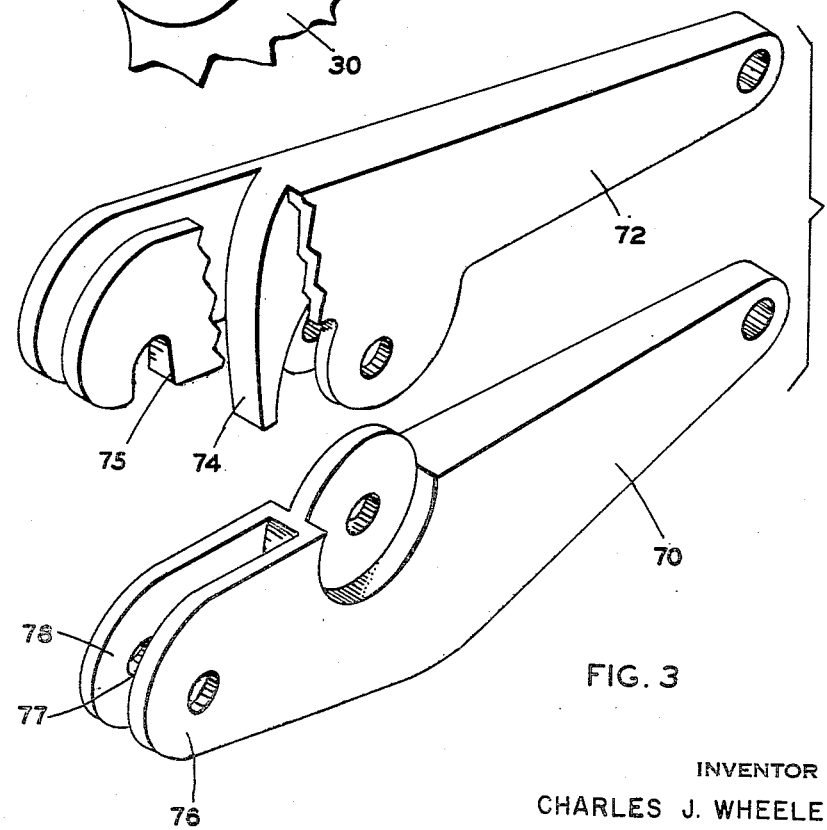
Fig. 3 is an enlarged perspective view, with parts broken away for clarity of another embodiment of cutter jaws of this invention.

Fig. 3 illustrates, in an exploded perspective view, another embodiment of cutter jaws 70 and 72 corresponding to jaws 22 and 24. In this embodiment, a projection 74 comprises an integral part of jaw 72 and is of such proportions as to lie subjacent cutters engaged by detent 75 and pin-retaining openings 77.

Figure 4:
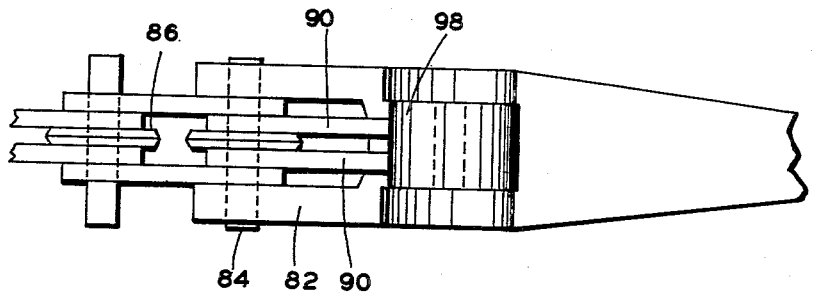
Fig. 4 is a fragmentary plan view taken along the line A—A of Fig. 5 of another embodiment of the invention shown in Fig. 5.
Figure 5:
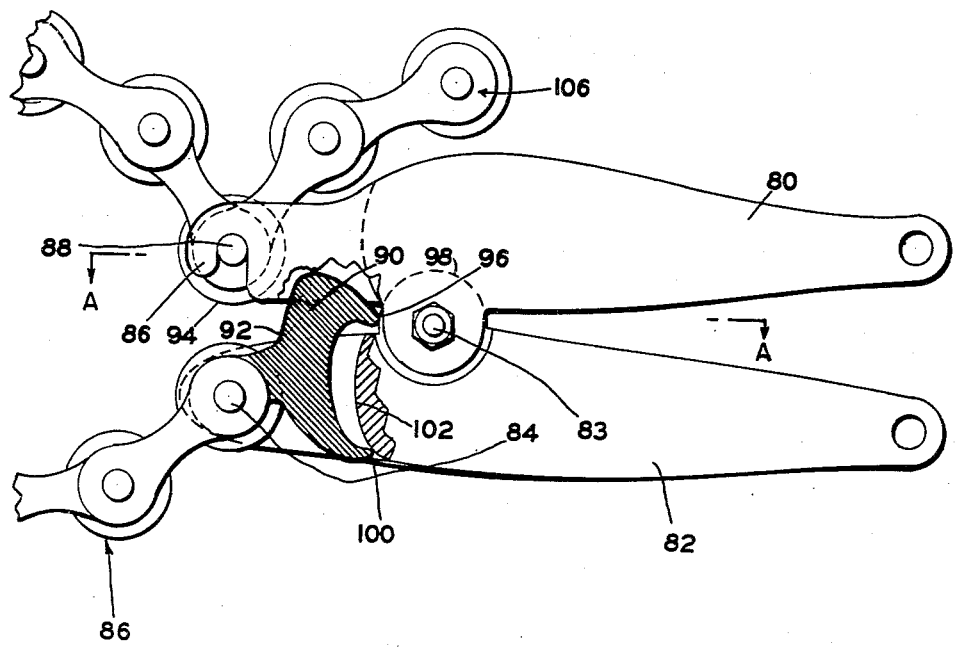
Fig. 5 is a fragmentary sectional view of another embodiment of the invention.

Figs. 4 and 5 illustrate still another, and preferred, embodiment of the invention. As there shown, in fragmentary form, partially in section, is a jaw assembly of the same general type as embodied in Fig. 1. The jaw assembly which is intended to be secured to compound leverage apparatus as embodied in Figs. 1 and 2, comprises, in combination, a pair of clamp jaws 80 and 82, joined at a common pivot 83 intermediate their ends. Jaw 82 is pivotally secured by pin 84 to one end of a cutter chain 86 of the type disclosed at 12 in Fig. 1. Jaw 80 engages, via detent 86, another cutter chain connecting pin 88 at a point on the cutter chain dictated by the size of the article to be cut.

Jaw 82 also is provided with a pair of hook-shaped projections 90 also retained in place by pin 84 as best shown in Fig. 4. These projections 90 include an upper surface 92 substantially in a line subjacent cutter 94 engaged by hook 86. Curved ends 96 bear against a curved pivot-forming section 98 of jaw 82. The other free ends 100 bear against the throat surface 102 of jaw 82. Hence, it will be appreciated that by adjustment of the curvature of the hook-shaped projections 90, the curvature of throat surface 102 also can be varied considerably while retaining the surface 92 in a desired position with respect to the cutters. As shown in Fig. 5, should the extra links, indicated generally as 106, not be extended backwardly through the U-shaped opening between the detent-bearing sections of jaw 80 in the manner illustrated, the upper surface 92 which is not dependent on the jaw spacing, precludes entry of the chain between the jaws 80 and 82.

The various cutters described herein may be formed of suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter the particular steel employed in forming the cutters and cutting edges is dictated by a consideration of the hardness, brittleness, availability, etc. The angle included between the surfaces defining a cutting edge generally may be varied also, a typically preferred angle being about 45°.

It is to be understood that although the invention has been described with specific reference to particular embodiments thereof, it is not to be so limited, since changes and alterations therein may be made which are within the full intended scope of this invention as defined by the appended claims.

What is claimed is:

1. A cutter comprising, in combination, a flexible, non-extensible, cutter chain and a pressure clamp to engage said chain about an article to be cut and to apply thereto, without rotation of said chain thereabout, radially-directed, article cutting pressure, at least one of said clamp jaws carrying a projection outstanding toward the opposite jaw and subjacent cutters engaged by said jaws.

2. A cutter as in claim 1 wherein the portions of clamp jaws adjacent the cutter chain comprise, in cross section, pivotally-joined U-shaped elements having means thereon to engage the cutter chain between the U-shaped elements via outstanding transverse projections on said chain, at least one of said jaws having an outstanding projection thereon which projects between the U-shaped elements of the opposite jaw in operation thereby to preclude engagement of said chain beyond the desired length.

3. A cutter as in claim 1 wherein the cutter chain is fixedly secured to one clamp jaw at a pivot and is provided with transverse pins projecting through and pivotally joining chain and cutter elements, the other clamp jaw having at least one detent thereon to engage at least one of said pins, said jaws carrying therebetween a transverse shield spaced from said pivot and detent a distance sufficient to preclude engagement of said chain.

4. Apparatus adapted to cut a hollow article, said apparatus including at least one cutter having a cutting edge adapted while substantially stationary with respect to said article to exert radially-directed article-cutting pressure and compound leverage means to apply pressure to said cutting edge via clamp jaws joined at a common pivot and secured to said cutter, at least one of said jaws having a projection thereon which extends over said common pivot sufficiently close to the ends of said jaws to preclude engagement of said cutter therebetween other than in a predetermined manner.

5. Apparatus according to claim 1 wherein a plurality of cutters are employed, said cutters being connected into a linkage adapted to surround said article and while stationary to apply substantially uniformly distributed radial pressure sufficient to cut said article without rotation of said apparatus about said article.

6. An apparatus for cutting pipe without rotation thereabout, said apparatus including a cutter assembly comprising a plurality of cutters connected into a non-extensible linkage adapted to place said cutters in contact with said pipe and to apply substantially uniformly-distributed radially-directed cutting pressure thereto while said cutters are substantially stationary with respect to said pipe, said linkage being connected to one jaw of a pressure clamp, the other jaw of said clamp being adapted to engage said linkage and a cantilever projection transversely between and through said jaws, clamp being adapted to apply tension to said linkage when said cutters are in contact with said pipe and thereby to impart sufficiently radially directed pressure to the circumference of said pipe to effect squeeze cutting thereof.

7. An apparatus for cutting cast iron pipe without rotation thereabout, said apparatus including a cutter assembly comprising a plurality of spaced, pivotally mounted cutters connected into a non-extensible chain adapted to encircle said pipe where cutting is desired and to apply thereto uniformly-distributed, inwardly-directed radial pipe cutting pressure while the cutters are stationary with respect to said pipe, one end of said linkage being connected to one jaw of a compound leverage pressure clamp, the other jaw of said clamp being adapted to engage said linkage at a point dictated by the diameter of said pipe, said clamp being adapted to apply tension to said linkage and thereby to impart uniformly-distributed pressure around the circumference of said pipe to effect cutting thereof, one of said jaws supporting a cantilever projection extending into the other jaw subjacent the point of connection of said chain thereto.

8. A cutter comprising, in combination, a flexible, non-extensible cutter chain of a length sufficient to surround a hollow article to be cut, and a compound leverage pressure clamp including a pair of clamp jaws comprising U-shaped elements joined at a first common pivot intermediate their ends, one of said jaws being pivotally secured to one end of said chain, the other jaw having means thereon to engage said chain at a point dictated by the size of the article to be cut, one of said jaws having secured thereto a projection extending across the wedge-shaped opening between said jaws adjacent the open ends thereof.

9. A cutter as in claim 8 wherein said projection comprises at least one projection resting on, and secured within the U-shaped elements of, one of said jaws and also resting on said first common pivot and extending toward the other jaw.

References Cited in the file of this patent

UNITED STATES PATENTS

| 137,076 | Hill | Mar. 25, 1873 |
|---|---|---|
| 236,695 | Porter | Jan. 18, 1881 |
| 1,168,125 | Stowell | Jan. 11, 1916 |
| 1,247,716 | Porter | Nov. 27, 1917 |
| 2,382,307 | Geddes | Aug. 14, 1945 |
| 2,793,433 | Wheeler | May 28, 1957 |